United States Patent [19]

Gartner

[11] 4,205,480
[45] Jun. 3, 1980

[54] RODENT TRAP

[75] Inventor: William J. Gartner, Bartlett, Ill.

[73] Assignee: Wilson Consolidated Enterprises, Ltd., Las Vegas, Nev.

[21] Appl. No.: 933,615

[22] Filed: Aug. 14, 1978

[51] Int. Cl.² .................................... A01M 23/38
[52] U.S. Cl. ............................................ 43/98
[58] Field of Search .................. 43/98, 99, 112, 131, 43/114, 65

[56] References Cited
U.S. PATENT DOCUMENTS

| | | | |
|---|---|---|---|
| 2,270,684 | 1/1942 | Kopisch | 43/112 |
| 2,302,787 | 11/1942 | Meehan | 43/98 |
| 2,340,255 | 1/1944 | Weil | 43/131 |
| 3,197,916 | 8/1965 | Cole | 43/98 X |
| 3,243,913 | 4/1966 | Carriero | 43/98 |
| 3,341,967 | 9/1967 | Kelley | 43/121 X |
| 3,388,497 | 6/1968 | Levine | 43/98 |
| 4,074,456 | 2/1978 | Tidwell | 43/98 |

FOREIGN PATENT DOCUMENTS

| | | | |
|---|---|---|---|
| 85344 | 6/1920 | Switzerland | 43/98 |
| 1301130 | 12/1972 | United Kingdom | 43/98 |

Primary Examiner—Nicholas P. Godici
Attorney, Agent, or Firm—Robert E. Wagner; Gerald T. Shekleton

[57] ABSTRACT

A trap for the control of rodents comprising a compartment having two spaced parallel electrodes in the compartment interior in close proximity to a bait holder. The investigation of the bait causes the body of the rodent to come into contact with the electrodes and be electrocuted. Baffles are placed in the compartment between the electrodes and the compartment opening to prevent fingers or other objects from coming into accidental contact with the electrodes.

13 Claims, 6 Drawing Figures

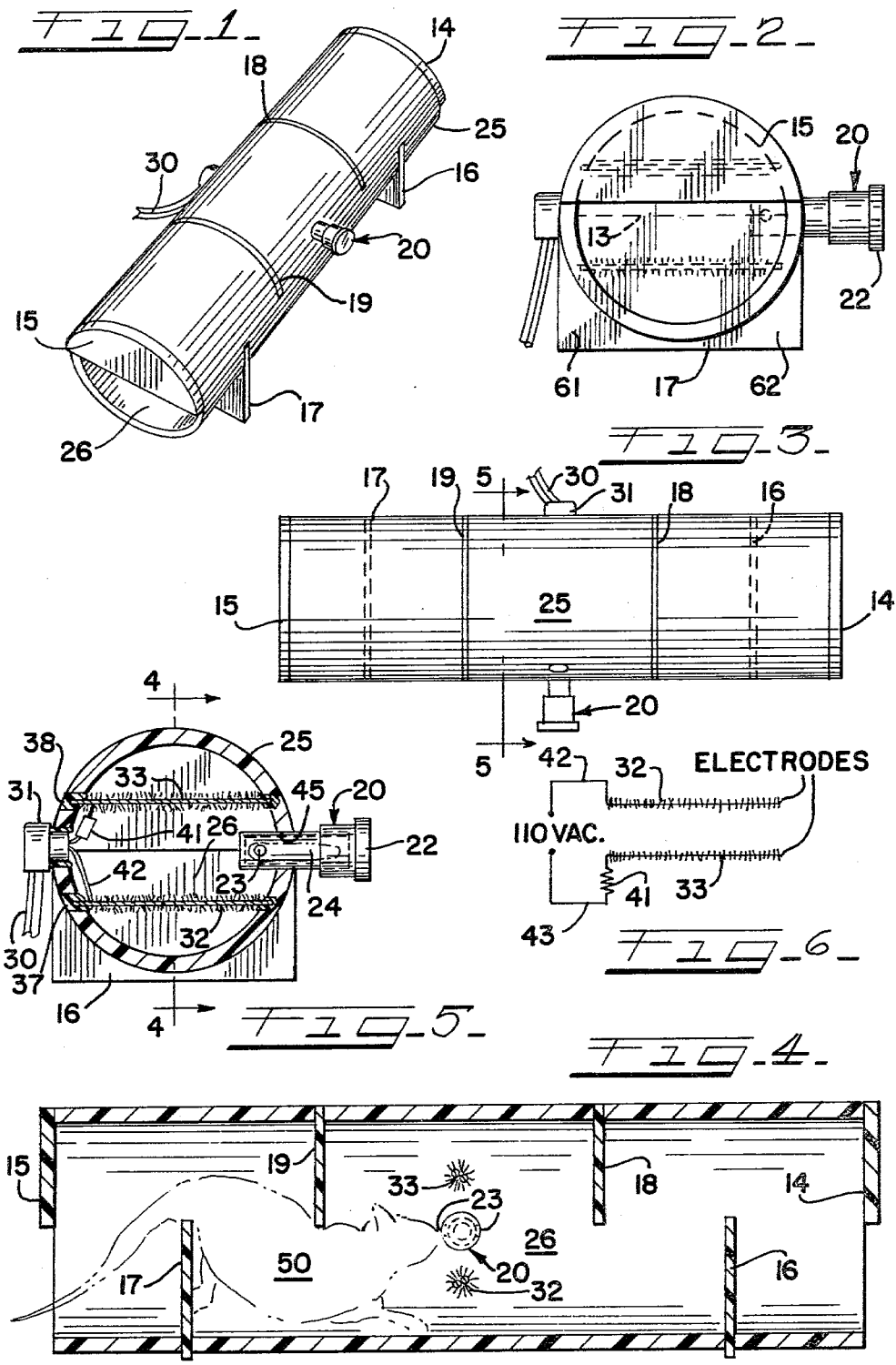

RODENT TRAP

BACKGROUND OF THE INVENTION

This invention relates to an apparatus for controlling the proliferation of small animals and more particularly, relates to an improved rodent trap.

The common practice of ridding a residence or other building of rodents has in the past been one of two methods. The first, and oldest, is to catch the rodent in a spring-loaded trap, using bait to lure the animal to the trap and cause it to trip the spring mechanism. The rodent is generally killed instantly, although in a bloody and nauseating manner. This type of trap is not foolproof and the rodents soon learn to steal the bait without triggering the spring mechanism, thereby rendering most traps useless. In addition, the baited trap may not kill the rodent quickly and can also be easily sprung by children or pets, resulting in their injury.

The second type of rodent control means in common use is the use of poison, most notably Dicumarol®, which the rodents injest and slowly die from. However, this method leaves the rodent free to seek a quiet place, such as inside walls in which to die. Of course, the poison must be placed in an area accessible to the rodent where pets and infants may also come into contact with it. Thus, such poison control means can be extremely dangerous to inquisitive children and pets and is limited to the places of use. The present invention overcomes the deficiencies of the prior art.

SUMMARY OF THE INVENTION

Therefore, an object of the subject invention is a rodent trap which will quickly and efficiently eliminate rodents.

Another object of the subject invention is a portable rodent trap which is safe to use and presents no danger to children or pets.

A further object of the subject invention is a rodent trap which will electrocute the rodent quickly and painlessly, and allow the disposal of the dead rodent body without contact with the body.

Still another object of the subject invention is a rodent trap which electrocutes the rodent while positively preventing human contact with the electrode, thereby eliminating accidental electrocution.

These and other objects are obtained in accordance with the present invention wherein there is provided a rodent trap generally used for the control of mice and rats. The rodent trap comprises a compartment having an opening by which the rodents may gain access to the interior of the compartment. Within the interior of the compartment is a bait or lure holder constructed so that the scent of the bait or lure is disseminated within the compartment and not outside the trap, although the bait or lure remains inaccessible to the rodent. Disposed about this bait holder and within the compartment are two electrodes. Placement of these electrodes is such that the rodent must come in contact with both of them upon investigation of the bait holder. A series of baffles are placed between the electrodes and the opening in such a manner as to preclude the entry of a finger or hand of a child while allowing the rodent to easily enter. In the preferred embodiment, these baffles comprise plates which each encompass slightly more than half the interior area of the compartment, each adjacent plate being disposed diametrically opposite one another. In this manner the rodent may easily enter the compartment to investigate the bait and eventual contact with the electrodes and electrocution while precluding the entry of pets, children or adults into the compartment. The dead rodent may be easily removed from the compartment by simply shaking the corpse into the nearest suitable repository. As there are no moving parts, and since the trap may be easily cleaned with soap and water, the rodent trap of the subject invention has an extremely long life expectancy and its simplicity of construction renders it practically fool-proof in operation.

The rodent trap of the subject invention may be employed without the use of the bait holder and still be effective, as the interior of the compartment in combination with the baffles presents a seemingly safe and comfortable place for the rodent to enter and investigate.

DESCRIPTION OF THE DRAWINGS

Further objects of the invention together with additional features contributing thereto and advantages accruing therefrom will be apparent from the following description of one embodiment of the invention when read in conjunction with the accompanying drawings wherein:

FIG. 1 is a perspective view of the subject invention;

FIG. 2 is an end view of the subject invention showing the end baffle plate and an interior baffle plate obstructing access to the interior of the compartment;

FIG. 3 is a top view of the subject invention showing the capped bait tube and power cord;

FIG. 4 is a cross-section taken along the line 4—4 of FIG. 3 showing the positioning of the electrodes and bait holder within the compartment of the subject invention;

FIG. 5 is a cross section taken along the line 5—5 of FIG. 3 showing the spacing between the electrodes and the bait holder as well as the power connection to the electrodes; and, FIG. 6 is a simplified schematic diagram of the electrical circuit of the subject invention.

Referring now to FIG. 1, there is shown a rodent trap 10 which comprises a hollow cylindrical tube open at opposing ends. While shown as cylindrical, the trap 10 may be of any shape such as irregular or polygonal. The material of which the trap body 10 is formed is preferably a one-piece electrically insulative plastic such as may be found in pipes and the like. The plastic should be fire resistant and capable of a zero burn rate in the applicable ASTM flame ratings test or, in the alternative, have an Underwriters Laboratory flame rating of 94 VO. Such ratings indicate that the plastic is substantially self-extinguishing after the application of a flame. The plastic which has been found most suitable for this application is an ABS/PVC alloy or homopolymer known as Kralastic® and marketed by Uniroyal Chemical.

In the embodiment shown in FIG. 1, the rodent trap 10 has outer walls 25. Baffles, visible on the exterior at 14, 15, 16, 17, 18 and 19 are attached to and protrude into the interior compartment of the rodent trap 10 at spaced points along the trap to prevent line of sight access through the interior of the compartment. Thus, the baffles serve as a barrier to the entry of any human limb or rigid objects which a child, for instance, may attempt to insert. The interior baffles 16, 17, 18 and 19 comprise plates inserted into saw cuts or similar recesses formed in the trap wall 25 and secured with a suitable cement such as a silicone sealant or any suitable solvent cement. Baffles 16 and 17 in the embodiment shown have legs 61 and 62 protruding from the exterior wall 25 of the trap 10 which serve to stabilize the cylindrical trap 10. Such legs may not be necessary for other more inherently stable shapes of traps. The exterior baffles 14 and 15 may be cemented to the outside of the respective opening to the trap 10 as shown, or in any other desired manner. Each interior baffle comprises a plate which covers slightly more than half of the circular area defined by the exterior wall 25. As shown in FIG. 2 in exaggerated detail, the lower surface of the outer plates 14 and 15 extends to the midpoint of the cylinder as represented by the dotted line 13 in FIG. 2 which represents the diameter of the cylinder. Each baffle in the interior is preferably oriented diametrically opposite adjacent baffles and extending past the midpoint 13 of the cylinder interior. Adjacent baffles preferably have a surface area equal to if not greater than the cross-sectional area of the cylinder. Thus, baffles 16 and 17, as shown in the drawings, may be placed on the lower portion of the rodent trap 10 while each adjacent baffle 14, 18, 19 and 15 is positioned on the upper portion of the rodent trap 10. (FIG. 4) While the interior baffles are shown in FIG. 2 to be translucent, this feature, while serving to allow the viewing of the interior of the trap, is not necessary.

The rodent traps may be of varying diameters 13 dependent on the size of the rodent to be controlled, and in all cases are small and lightweight enough to be easily portable. For instance, in the control of house mice, a cylinder 2⅜" diameter is sufficient. However, when the object of pest control is rats, a larger cylinder is contemplated. In the larger traps, the baffles 18 and 19 are desirable; in the smaller traps such as those described above for use with mice, the baffles 18 and 19 become unnecessary as the size of the trap 10 itself becomes a barrier to children's inquisitive fingers and the like, when used with an exterior and interior baffle on either side of the electrodes.

The baffles present no real or apparent obstacle to a mouse or rat, and in fact, the trap 10 initially appears to be an ideal hiding place, appearing to serve as concealment while consuming what the rodent detects sensually. If the bait holder is not employed, the rodent is still apt to enter the trap to investigate, as the result of rodents' well known propensity and curiosity especially for confined protected areas such as the trap of the subject invention externally appears to present.

As best shown in FIG. 5, the bait holder 20 comprises a tube or other duct which extends through an opening 45 in the exterior wall 25 of the trap 10. This tube is closed on its interior end and has openings 23 on an interior portion of the tube walls. The bait, if used, may be supplied in the form of a pre-formulated bait stick 24 which is placed inside the tube. Of course, the bait may be the traditional cheese, peanut butter or the like. The exterior of the tube 20 is closed and sealed with a cap 22. The aroma or fragrance of the bait 24 will then escape through the openings 23 into the interior compartment 26 of the rodent trap 10 (FIGS. 4 and 5).

In the midsection of the interior compartment 26 are two spaced electrodes 32 and 33, each of which extend across the interior compartment in a spaced parallel relationship, barring passage past the electrodes 32 and 33 except on contact with them.

The wires 30 are connected to a power source (not shown) such as a 110 v outlet and pass through an opening 46 in the wall 25 of the trap 10 through a suitable strain-relief device 31 (FIG. 5). These electrodes are preferably brushes comprising copper strand wound on a conductive brass wire. The copper strands assure effective electrical contact throughout the length of the electrode for the body of any rodent which touch or come in physical contact with the electrodes. As shown in the diagram of FIG. 6, one electrode 33 is connected in series with an impedance means such as a resistor 41 to a positive potential. The resistor preferably has a value of 10 ohms, although any value from 1 to 30 ohms would provide current sufficient to electrocute the rodent. The other electrode 32 is connected to ground through lead 42. A rodent 50, shown in FIG. 4 investigating the scent given off by the bait 24 in the bait holder 20 would come into contact with both of the electrodes 32 and 33 during its investigation of the bait scent, thereby, in effect, short circuiting the electrodes and electrocuting itself.

Care should be exercised in the selection of the resistance valve employed in the resistor 41, as too high a resistance will only stun the rodent, and too low a resistance will cause a potential field so great as will affect the animal hairs and cause them to "stand on end." The animal would sense this potential and, anticipating the danger, back off.

The method of assembly of the preferred version of the rodent trap 10 involves molding such as by injection molding, extrusion or the like, hot (approximately 400° F.) Kralastic ® ABS into the desired shape, such as the cylinder shown in FIG. 1. The molded trap is cooled and solidified. The slots for the baffles 16, 17, 18 and 19 are formed by an appropriate saw cut or the like. Openings 45 and 46 are drilled opposite one another in the midsection of cylinder wall 25, one for the insertion of the power cord, and the other to secure the bait holder. Two smaller holes are drilled on either side of the power cord opening 46 completely through one side of the exterior wall 25 and partially through the opposite exterior wall. The electrodes 32 and 33 are inserted through the opening and secured tightly in place by the application of an electrically insulated sealant, such as silicone resin or the like at 37 and 38 to both mechanically secure the electrodes in place and electrically insulate the electrodes from the exterior surface of the rodent trap 10. The power cord 30 is inserted through strain relief 31 and the lead 43 is connected in series through the resistor 41 to the electrode 33. The electrode 32 is connected to the ground lead 42 and the baffles and bait holder are inserted in place and secured with silicone sealant, or a suitable solvent cement.

The unit is energized by plugging the power cord 30 into an ordinary 110 v household outlet and placed against a wall or where desired. When in such use, no power is consumed until a rodent contacts both electrodes. A rodent will enter it seeking refuge or to investigate the bait, the aroma of which it detects. The body of the rodent then will make contact with the two electrodes inside the cylinder during its investigation and be instantly electrocuted. The presence of the body of a dead rodent can be detected by the tell-tale tail protruding from the cylinder. The body can then be shaken into a container or bag for disposal, without contact with a person's hands.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. An apparatus for the eradication of animals such as rodents and the like, comprising a compartment having an open end, baffle means for preventing line of sight access to the interior of said compartment, said baffle means being plates and including an end plate partially covering said open end and a plurality of spaced baffle plates mounted on an interior wall surface of said compartment adjacent complementary plates being located on opposing sides of said interior wall surface of said compartment and having a combined surface area at least equal to the cross-sectional area of said compartment, a pair of electrodes, said electrodes being connected to a source of electrical power for applying a voltage to induce a desired lethal potential across said electrodes, whereby said animals come into said compartment across said baffle means, come into contact with said electrodes and incur a lethal shock.

2. The apparatus of claim 1 wherein an impedance means is connected in series with said source of electrical power and said electrodes for inducing said desired lethal potential.

3. The apparatus of claim 2 wherein said impedance means comprises a resistor having a resistance value of 1-30 ohms.

4. The apparatus of claim 3 wherein said resistor has a resistance value of approximately 10 ohms.

5. The apparatus of claim 1 wherein said compartment is formed of a plastic material which does not repel said animals.

6. The apparatus of claim 1 wherein said compartment is formed of a polymeric material which is electrically insulative and has a substantially zero burn rate after application of a flame to said polymeric material.

7. The apparatus of claim 1 wherein said compartment is formed of a homopolymer of ABS and PVC.

8. The apparatus of claim 1 wherein said electrodes comprise copper stranded brushes.

9. The apparatus of claim 1 wherein a bait holding means is positioned proximate to said electrodes and comprises a port formed in a wall of said compartment into which said bait may be placed.

10. The apparatus of claim 9 wherein said bait holding means includes a cartridge inserted into said port, having at least one opening at an interior end and an opening at an exterior end, said exterior end opening being capable of being sealed closed.

11. The apparatus of claim 10 wherein said interior end opening comprises two small openings in a wall of said cartridge.

12. A portable rodent trap for control and eradication of rats, mice and the like, comprising an elongated hollow housing having an interior wall surface and an opening at opposing ends, said housing having a plurality of spaced baffle plates mounted to said interior wall surface of said housing, adjacent complementary baffle plates being located on opposing sides of said interior wall surface of said housing and having a combined surface area at least equal to the cross-sectional area of said housing, a pair of electrodes mounted in spaced parallel relation in a midsection of said interior and connected through an impedance means to a source of electrical power for creating a desired lethal potential across said electrodes, a bait holding means mounted through a wall of said housing for location between said electrodes, said bait holding means having a first opening on an exterior end for insertion of bait, said opening being sealable by a cap means, and a second opening in an interior end of said bait holding means for the escape of bait aroma into said housing interior, whereby said rodent may enter said housing, sense the presence of the bait, cross said baffle plates, come into contact with said electrodes with its body and be electrocuted.

13. An apparatus for the eradication of animals such as rodents and the like, comprising a cylindrical compartment being open at each end and having a passageway from each open end to the interior, baffle means for preventing line of sight access in said passageways to the interior of said compartment, a pair of electrodes in the midsection of said compartment, said baffle means being plates, including an end plate partially covering each of said open ends and a plurality of spaced baffle plates within said compartment, adjacent plates in each passageway being on opposing sides of said interior and having a combined surface area equal to the cross-sectional area of said compartment to provide an interrupted passageway whereby access for small animals such as rodents and the like is maintained, while direct access, such as by fingers, tools and the like is denied, said electrodes being connected to a source of electrical power for applying a voltage to induce a desired lethal potential across said electrodes, whereby said animals inquisitive of said compartment, are lured into said passageway across said baffle means, come into contact with said electrodes and incur a lethal shock.

* * * * *